United States Patent
Hung et al.

(10) Patent No.: US 8,390,357 B2
(45) Date of Patent: Mar. 5, 2013

(54) FIXED DEAD TIME PFC CONTROLLER

(75) Inventors: Chia-Chieh Hung, Taipei (TW); Yen-Hui Wang, Taipei (TW)

(73) Assignee: Immense Advance Technology Corp., Neihu District Taipei (TW)

( * ) Notice: Subject to any disclaimer, the term of this patent is extended or adjusted under 35 U.S.C. 154(b) by 146 days.

(21) Appl. No.: 13/118,208

(22) Filed: May 27, 2011

(65) Prior Publication Data
US 2012/0299570 A1 Nov. 29, 2012

(51) Int. Cl.
*G06F 1/04* (2006.01)
(52) U.S. Cl. ......... 327/291; 327/299; 323/282; 323/284
(58) Field of Classification Search ........................ None
See application file for complete search history.

(56) References Cited

U.S. PATENT DOCUMENTS

| | | | |
|---|---|---|---|
| 2012/0043908 A1* | 2/2012 | Hung et al. | 315/291 |
| 2012/0126759 A1* | 5/2012 | Lee et al. | 323/205 |

* cited by examiner

*Primary Examiner* — An Luu
(74) *Attorney, Agent, or Firm* — Shimokaji & Associates P.C.

(57) ABSTRACT

A fixed dead time PFC controller, comprising: an amplitude normalization circuit, used to generate a normalized signal according to a full-wave rectified input voltage; a comparator circuit, used to compare the normalized signal with a threshold voltage to generate a select signal, wherein the select signal exhibits a first state when the normalized signal is higher than the threshold voltage, and a second state when the normalized signal is lower than the threshold voltage; and a driving signal selection circuit, having a first input end coupled to a first driving signal, a second input end coupled to a second driving signal, a control end coupled to the select signal, and an output end for outputting a gate driving signal.

9 Claims, 4 Drawing Sheets

FIXED DEAD TIME PFC CONTROLLER

BACKGROUND OF THE INVENTION

1. Field of the Invention

The present invention relates to a power conversion controller, and more particularly to a power conversion controller capable of providing PFC (Power Factor Correction) for power conversion applications.

2. Description of the Related Art

FIG. 1 illustrates a power conversion application, in which a prior art PWM/PFC circuit capable of providing a PWM (Pulse Width Modulation) function and a power factor correction function is used to control a BUCK conversion such that the waveform of an input current of the BUCK power conversion application is analog to that of a full-wave rectified input voltage $V_{Full\_Wave}$, and a regulated DC output voltage $V_O$ (or output current $I_O$) is generated. As can be seen in FIG. 1, the power conversion application includes a PWM/PFC circuit 100, a power switch 101, a diode 102, an inductor 103, and a load 104.

The PWM/PFC circuit 100 is used to generate a driving signal $V_G$ according to a feedback signal $V_{FB}$ and the full-wave rectified input voltage $V_{Full\_Wave}$, so that the output voltage $V_O$ or output current $I_O$ is regulated at a DC value with the input current $I_{IN}$ following the full-wave rectified input voltage $V_{Full\_Wave}$, wherein the feedback signal $V_{FB}$ is generally derived from the output voltage $V_O$ or from the input current $I_{IN}$.

The power switch 101, typically a MOSFET, is used to control the power conversion from the full-wave rectified input voltage $V_{Full\_Wave}$ to the output voltage $V_O$.

The diode 102 is used as a unilateral switch to release the energy stored in the inductor 103 when the power switch 101 is turned off.

The inductor 103 is used to store energy in the form of current when the power switch is turned on, and release the stored energy to the load 104 when the power switch 101 is turned off.

The load 104 can be a resistive load or a non-resistive load composed of LEDs.

When in operation, due to the full-wave rectified waveform, the voltage level of $V_{Full\_Wave}$ falls below the output voltage $V_O$ during part of a period, and no energy is transformed from $V_{Full\_Wave}$ to $V_O$ during that part of a period. As a result, the energy delivered to the load 104 in a period is dependent on the amplitude of $V_{Full\_Wave}$, the higher the amplitude, the more energy delivered in a period. Please refer to FIG. 2, which illustrates the waveforms of a high amplitude full-wave rectified input voltage $V_{Full\_Wave.High}$ and a low amplitude full-wave rectified input voltage $V_{Full\_Wave.Low}$ compared with a DC output voltage $V_O$. As seen in FIG. 2, $V_{Full\_Wave.High}$ has a dead time $T_{dH}$ during when $V_{Full\_Wave.High}$ is lower than $V_O$, and an active time $T_{aH}$ during when $V_{Full\_Wave.High}$ is higher than $V_O$, and $V_{Full\_Wave.Low}$ has a dead time $T_{dL}$ during when $V_{Full\_Wave.Low}$ is lower than $V_O$, and an active time $T_{aL}$ during when $V_{Full\_Wave.Low}$ is higher than $V_O$, wherein $T_{dH}$ is shorter than $T_{dL}$ and $T_{aH}$ is longer than $T_{aL}$. Therefore, the energy delivered in a period by $V_{Full\_Wave.High}$ is more than that by $V_{Full\_Wave.Low}$, and it causes inconsistency in many aspects—such as power factor, average output current, etc.—of the power conversion application. For example, if the output current $I_O$ is to be regulated at a DC value $I_{CONST}$, then the resulted average of the output current $I_O$ will be equal to $I_{CONST} \times T_{aH}/(T_{aH}+T_{dH})$ for the high amplitude full-wave rectified input voltage $V_{Full\_Wave.High}$, and equal to $I_{CONST} \times T_{aL}/(T_{aL}+T_{dL})$ for the low amplitude full-wave rectified input voltage $V_{Full\_Wave.Low}$, and it can be shown that $T_{aH}/(T_{aH}+T_{dH})$ is larger than $T_{aL}/(T_{aL}+T_{dL})$.

In view of this inconsistency problem, the present invention proposes a PFC power conversion controller capable of fixing the dead time for power conversion applications.

SUMMARY OF THE INVENTION

The major objective of the present invention is to propose a PFC power conversion controller capable of fixing the dead time for a power conversion application.

Another objective of the present invention is to propose a PFC power conversion controller capable of offering constant average output current irrespective of the amplitude of the full-wave rectified input voltage.

Still another objective of the present invention is to propose a PFC power conversion controller capable of offering constant average output voltage irrespective of the amplitude of the full-wave rectified input voltage.

Still another objective of the present invention is to propose a PFC power conversion controller capable of offering constant power factor irrespective of the amplitude of the full-wave rectified input voltage.

To achieve the foregoing objectives of the present invention, a fixed dead time PFC controller is proposed, the fixed dead time PFC controller including:

an amplitude normalization circuit, used to generate a normalized signal according to a full-wave rectified input voltage, wherein the normalized signal has a constant amplitude;

a comparator circuit, used to compare the normalized signal with a threshold voltage to generate a select signal, wherein the select signal exhibits a first state when the normalized signal is higher than the threshold voltage, and a second state when the normalized signal is lower than the threshold voltage;

a PWM/PFC circuit, used to generate a first driving signal to keep an output voltage or an output current of a power conversion application regulated at a DC value with the input current of the power conversion application following the full-wave rectified input voltage; and a driving signal selection circuit, having a first input end coupled to the first driving signal, a second input end coupled to a second driving signal, a control end coupled to the select signal, and an output end for outputting a gate driving signal, wherein the gate driving signal is provided by the first driving signal when the select signal exhibits the first state, and provided by the second driving signal when the select signal exhibits the second state.

Preferably, the amplitude normalization circuit includes a variable gain amplifier, a peak detector, and an amplifier.

Preferably, the variable gain amplifier is used to amplify the full-wave rectified input voltage with a gain, which is controlled by a gain control signal, to generate the normalized signal.

Preferably, the peak detector is used to generate a peak signal representing the peak voltage of the normalized signal.

Preferably, the amplifier is used to generate the gain control signal by amplifying the difference of the peak signal and a DC voltage.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
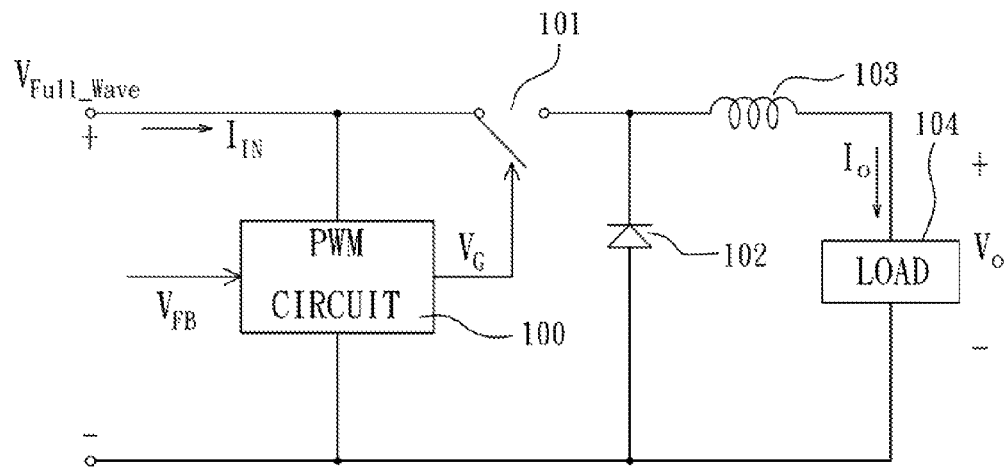
FIG. 1 illustrates a power conversion application including a prior art PWM/PFC circuit capable of providing a pulse width modulation function and a power factor correction function.
Figure 2:
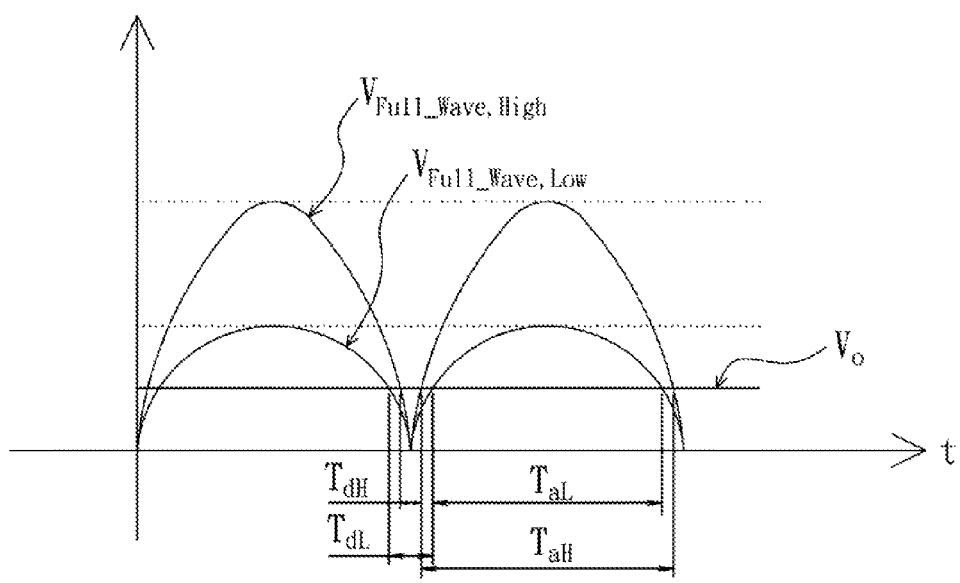
FIG. 2 illustrates the waveforms of a high amplitude full-wave rectified input voltage $V_{Full\_Wave.High}$ and a low amplitude full-wave rectified input voltage $V_{Full\_Wave.Low}$ compared with a DC output voltage $V_O$.
Figure 3A:
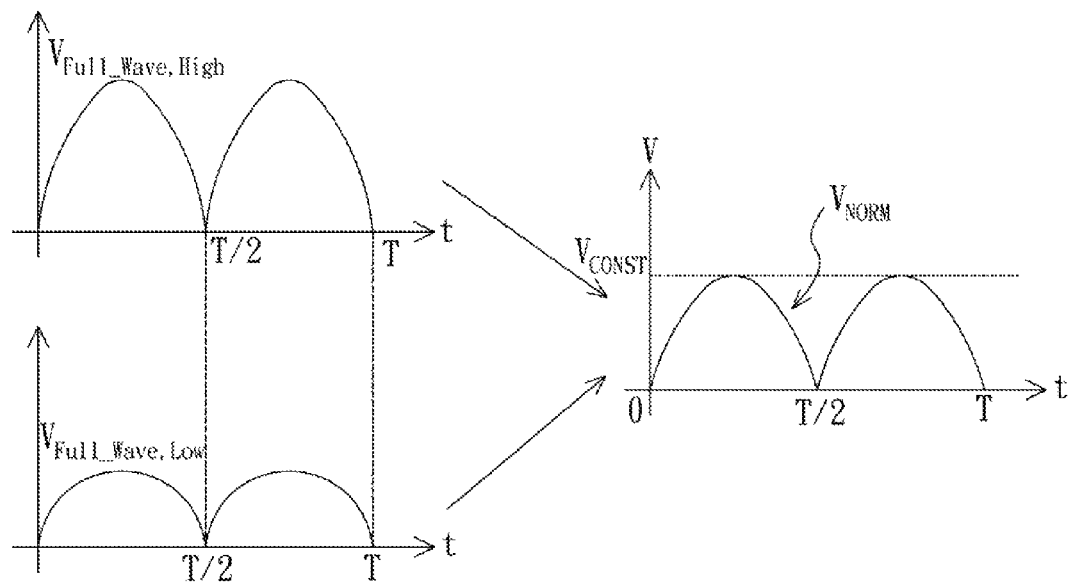
FIG. 3a illustrates the concept of amplitude normalization on the full-wave rectified input voltage of the present invention.
Figure 3B:
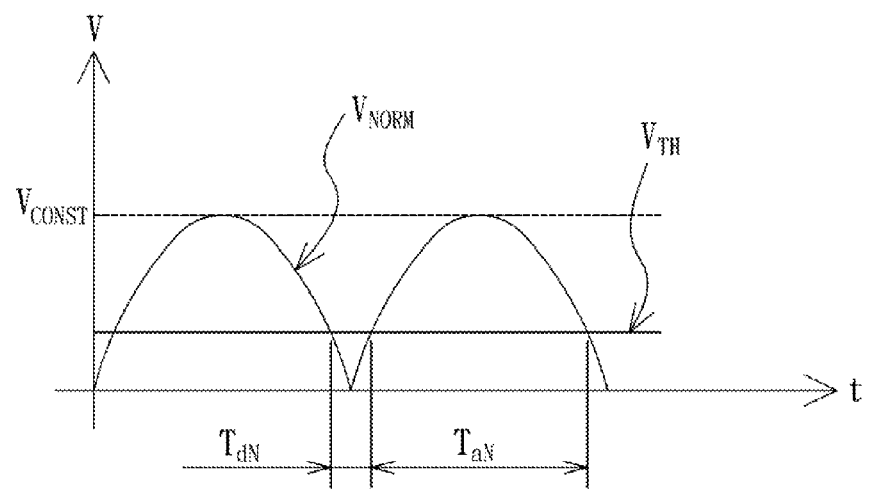
FIG. 3b illustrates the waveform of a normalized signal compared with a DC threshold voltage to generate a fixed dead time.

To fix the dead time inconsistency problem, the present invention proposes an amplitude normalization circuit, and the concept of which is illustrated in FIG. 3a. As illustrated in FIG. 3a, both a high amplitude full-wave rectified input voltage $V_{Full\_Wave.High}$ and a low amplitude full-wave rectified input voltage $V_{Full\_Wave.Low}$ are processed to generate a same normalized signal $V_{NORM}$ with a constant amplitude $V_{CONST}$, and the same normalized signal $V_{NORM}$ can be used to generate a fixed dead time. Please refer to FIG. 3b, which illustrates the waveform of a normalized signal compared with a DC threshold voltage to generate a fixed dead time. As illustrated in FIG. 3b, a normalized signal $V_{NORM}$ is compared with a DC threshold voltage $V_{TH}$ to generate a normalized dead time $T_{dN}$ and a normalized active time $T_{aN}$.

Figure 4:
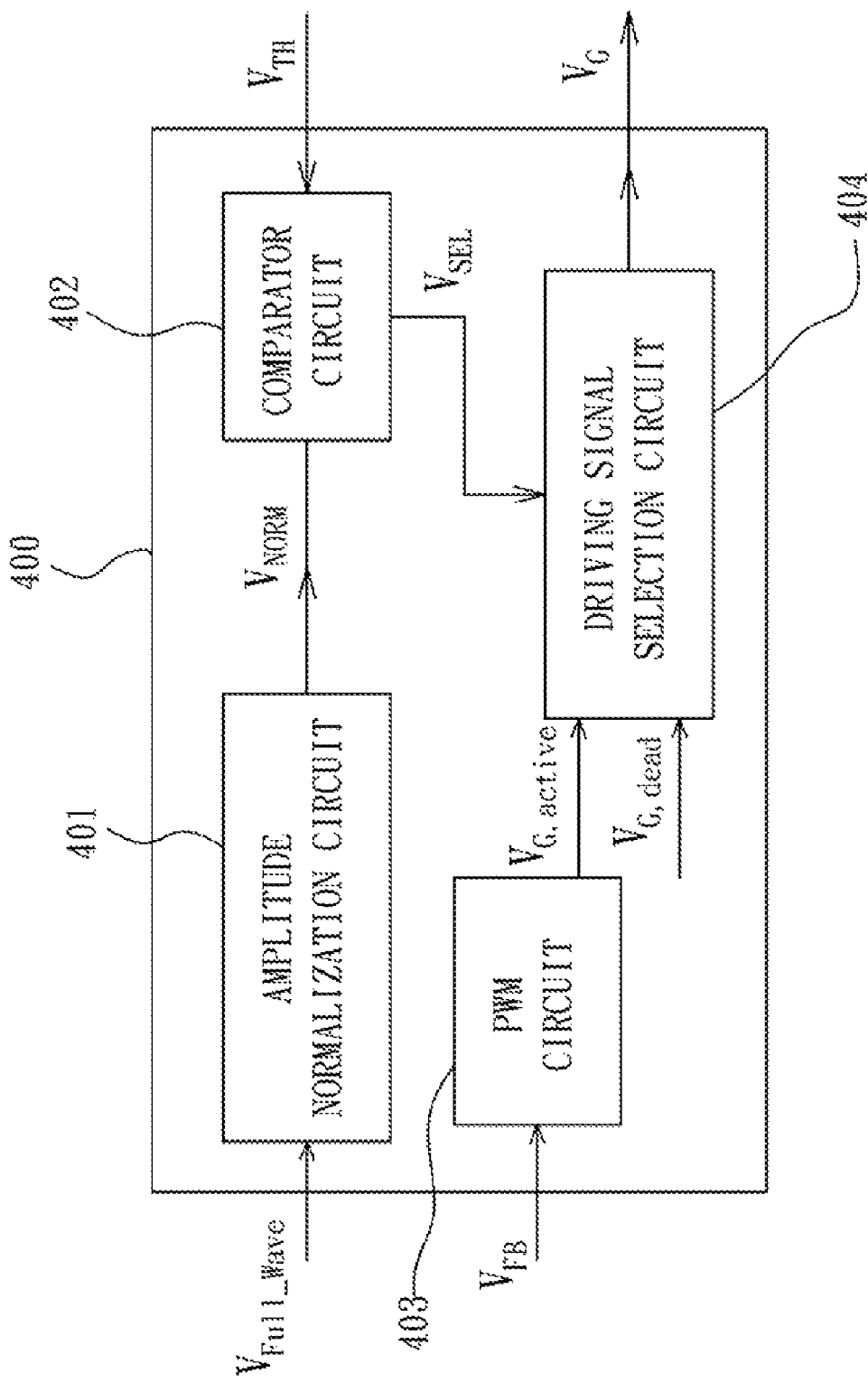
FIG. 4 illustrates the block diagram of a fixed dead time PFC controller according to a preferred embodiment of the present invention.

Based on the specified concept above, the present invention proposes a fixed dead time PFC controller. Please refer to FIG. 4, which illustrates the block diagram of a fixed dead time PFC controller according to a preferred embodiment of the present invention. As illustrated in FIG. 4, a fixed dead time PFC controller 400 includes an amplitude normalization circuit 401, a comparator circuit 402, a PWM/PFC circuit 403, and a driving signal selection circuit 404.

Figure 5:
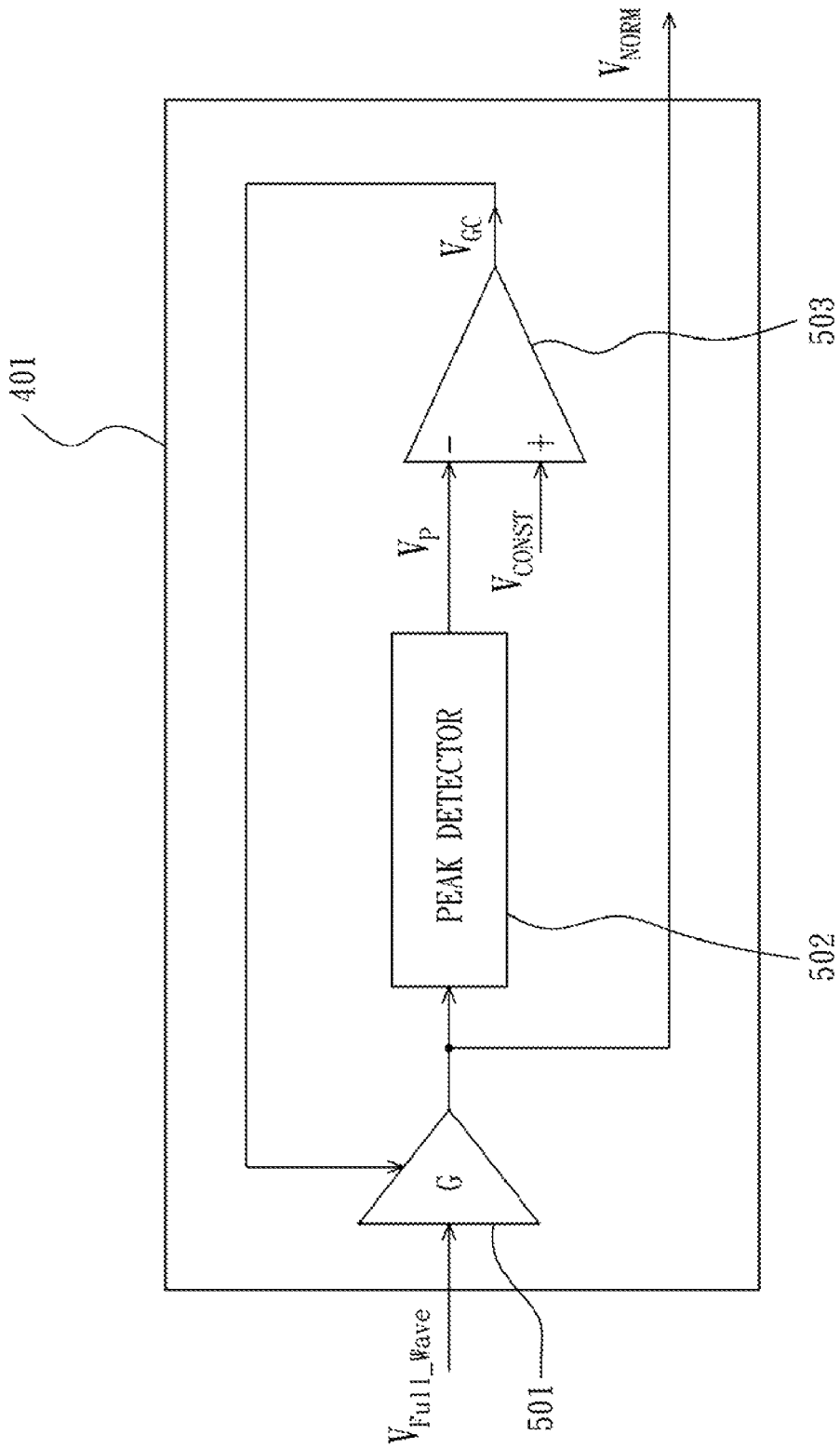
FIG. 5 illustrates the block diagram of an amplitude normalization circuit in FIG. 4 according to a preferred embodiment of the present invention.

The amplitude normalization circuit 401 is used to generate a normalized signal $V_{NORM}$ according to a full-wave rectified input voltage $V_{Full\_Wave}$, wherein the amplitude of the normalized signal $V_{NORM}$ is constant irrespective of the amplitude of the full-wave rectified input voltage $V_{Full\_Wave}$. To implement the amplitude normalization circuit 401, please refer to FIG. 5, which illustrates the block diagram of the amplitude normalization circuit 401 according to a preferred embodiment of the present invention. As illustrated in FIG. 5, the amplitude normalization circuit 401 used to generate the normalized signal $V_{NORM}$ according to the full-wave rectified input voltage $V_{Full\_Wave}$, includes a variable gain amplifier 501, a peak detector 502, and an amplifier 503.

The variable gain amplifier 501 is used to amplify the full-wave rectified input voltage $V_{Full\_Wave}$ with a gain, which is controlled by a gain control signal $V_{GC}$, to generate the normalized signal $V_{NORM}$.

The peak detector 502 is used to generate a peak signal $V_P$ representing the peak voltage of $V_{NORM}$.

The amplifier 503 is used to generate the gain control signal $V_{GC}$ by amplifying the difference of $V_P$ and a DC voltage $V_{CONST}$.

Due to the virtual short of the input ends of the amplifier 503 in negative feedback configuration, $V_P$ is to approach $V_{CONST}$, and the amplitude of $V_{NORM}$ is then a constant irrespective of the amplitude of the full-wave rectified input voltage $V_{Full\_Wave}$.

The comparator circuit 402 is used to compare the normalized signal $V_{NORM}$ with a threshold voltage $V_{TH}$ to generate a select signal $V_{SEL}$, wherein the select signal $V_{SEL}$ exhibits a first state (for example but not limited to a high level) when the normalized signal $V_{NORM}$ is higher than the threshold voltage $V_{TH}$, and a second state (for example but not limited to a low level) when the normalized signal $V_{NORM}$ is lower than the threshold voltage $V_{TH}$. The threshold voltage $V_{TH}$ is preferably set at a level such that the normalized dead time $T_{dN}$ is equal to the time the $V_{Full\_Wave}$ of possible lowest amplitude falls below the output voltage of a power conversion application.

The PWM/PFC circuit 403 is used to generate a first driving signal $V_{Gactive}$. The first driving signal $V_{Gactive}$, when applied to a power switch, can keep the output voltage or output current of the power conversion application regulated at a DC value with the input current of the power conversion application following the hall-wave rectified input voltage $V_{Full\_Wave}$.

The driving signal selection circuit 404 has a first input end coupled to the first driving signal $V_{Gactive}$, a second input end coupled to a second driving signal $V_{Gdead}$, a control end coupled to the select signal $V_{SEL}$, and an output end for outputting a gate driving signal $V_G$, wherein the gate driving signal $V_G$ is provided by the first driving signal $V_{Gactive}$ when the select signal $V_{SEL}$ exhibits the first state, and provided by the second driving signal $V_{Gdead}$ when the select signal $V_{SEL}$ exhibits the second state. The second driving signal $V_{Gdead}$ is preferably set at a low level.

When the fixed dead time PFC controller 400 is used in a power conversion application, a fixed dead time $T_{dN}$ and a fixed active time $T_{aN}$ (as illustrated in FIG. 3b) will be generated irrespective of the amplitude of $V_{Full\_Wave}$, so that the energy delivered in a period by $V_{Full\_Wave}$ will be fixed to offer consistency in many aspects—such as power factor, average output current, etc.—of the power conversion application. For example, if the output current $I_O$ is to be regulated at a DC value $I_{CONST}$, then the resulted average of the output current $I_O$ will be fixed to $I_{CONST} \times T_{aN}/(T_{aN}+T_{dN})$ irrespective of the amplitude of $V_{Full\_Wave}$.

As can be seen from the specification above, by using the fixed dead time PFC controller of the present invention, a consistent performance for a power conversion application can be achieved when the power conversion application is powered by different full-wave rectified voltages of different amplitudes. Therefore, the present invention does improve the prior art controllers and is worthy of being granted a patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A fixed dead time PFC controller, comprising:
    an amplitude normalization circuit, used to generate a normalized signal according to a full-wave rectified input voltage, wherein said normalized signal has a constant amplitude;
    a comparator circuit, used to compare said normalized signal with a threshold voltage to generate a select signal, wherein said select signal exhibits a first state when said normalized signal is higher than said threshold voltage, and a second state when said normalized signal is lower than said threshold voltage; and
    a driving signal selection circuit, having a first input end coupled to a first driving signal, a second input end coupled to a second driving signal, a control end coupled to said select signal, and an output end for outputting a gate driving signal, wherein said gate driving signal is provided by said first driving signal when said select signal exhibits said first state, and provided by said second driving signal when said select signal exhibits said second state.

2. The fixed dead time PFC controller as claim 1, further comprising a PWM/PFC circuit to generate said first driving signal.

3. The fixed dead time PFC controller as claim 2, wherein said second driving signal is set at a low level.

4. The fixed dead time PFC controller as claim 3, wherein said amplitude normalization circuit comprises:
    a variable gain amplifier, used to amplify said full-wave rectified input voltage with a gain, which is controlled by a gain control signal, to generate said normalized signal;
    a peak detector, used to generate a peak signal representing the peak voltage of said normalized signal; and
    an amplifier, used to generate said gain control signal by amplifying the difference of said peak signal and a DC voltage.

5. A fixed dead time PFC controller, comprising:
    a variable gain amplifier, used to amplify a full-wave rectified input voltage with a gain, which is controlled by a gain control signal, to generate a normalized signal;
    a peak detector, used to generate a peak signal representing the peak voltage of said normalized signal;
    an amplifier, used to generate said gain control signal by amplifying the difference of said peak signal and a DC voltage;
    a comparator circuit, used to compare said normalized signal with a threshold voltage to generate a select signal, wherein said select signal exhibits a first state when said normalized signal is higher than said threshold voltage, and a second state when said normalized signal is lower than said threshold voltage; and
    a driving signal selection circuit, having a first input end coupled to a first driving signal, a second input end coupled to a second driving signal, a control end coupled to said select signal, and an output end for outputting a gate driving signal, wherein said gate driving signal is provided by said first driving signal when said select signal exhibits said first state, and provided by said second driving signal when said select signal exhibits said second state.

6. The fixed dead time PFC controller as claim 5, further comprising a PWM/PFC circuit to generate said first driving signal.

7. The fixed dead time PFC controller as claim 6, wherein said second driving signal is set at a low level.

8. A fixed dead time PFC controller, comprising:
    a variable gain amplifier, used to amplify a full-wave rectified input voltage with a gain, which is controlled by a gain control signal, to generate a normalized signal:
    a peak detector, used to generate a peak signal representing the peak voltage of said normalized signal;
    an amplifier, used to generate said gain control signal by amplifying the difference of said peak signal and a DC voltage;
    a comparator circuit, used to compare said normalized signal with a threshold voltage to generate a select signal, wherein said select signal exhibits a first state when said normalized signal is higher than said threshold voltage, and a second state when said normalized signal is lower than said threshold voltage;
    a PWM/PFC circuit, used to generate a first driving signal; and
    a driving signal selection circuit, having a first input end coupled to said first driving signal, a second input end coupled to a second driving signal, a control end coupled to said select signal, and an output end for outputting a gate driving signal, wherein said gate driving signal is provided by said first driving signal when said select signal exhibits said first state, and provided by said second driving signal when said select signal exhibits said second state.

9. The fixed dead time PFC controller as claim 8, wherein said second driving signal is set at a low level.

* * * * *